United States Patent [19]

Thomas et al.

[11] Patent Number: 4,806,914

[45] Date of Patent: Feb. 21, 1989

[54] DETECTION BY AUTOMATIC GAIN CONTROL FEATURES OF GRADUAL CUTTING TOOL BREAKAGE

[75] Inventors: Charles E. Thomas, Scotia; James F. Bedard, Schenectady; Lawson P. Harris, Scotia; Douglas G. Wildes, Ballston Lake; Steven R. Hayashi, Schenectady, all of N.Y.

[73] Assignee: General Electric Company, Schenectady, N.Y.

[21] Appl. No.: 46,812

[22] Filed: May 7, 1987

[51] Int. Cl.⁴ .............................................. G08B 21/00
[52] U.S. Cl. .................................... 340/680; 340/683; 73/104; 73/660
[58] Field of Search ........................ 340/679, 680, 683; 73/104, 593, 658, 660; 364/474, 475, 508; 330/284

[56] References Cited

U.S. PATENT DOCUMENTS

| | | | |
|---|---|---|---|
| 4,514,797 | 8/1985 | Begin | 364/148 |
| 4,563,897 | 1/1986 | Moore | 73/587 |
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |
| 4,764,760 | 8/1988 | Bedard et al. | 340/683 |

Primary Examiner—Joseph A. Orsino
Assistant Examiner—Jeffery A. Hofsass
Attorney, Agent, or Firm—Donald R. Campbell; James C. Davis, Jr.; Paul R. Webb, II

[57] ABSTRACT

A tool break detection system has an automatic gain control to adjust the analog signal channel gain and hold the cutting vibration signal at a desired average level. The AGC time constant is long enough that the detection of abrupt tool breaks and sudden large signal level transistions by the digital signature recognition logic is unaffected. However, the gradual decrease in signal level produced by a crumbly-type break would be removed by AGC action. In a system with a hardware AGC, crossing a high gain threshold resets gain to a low value and the resulting abrupt and persisting change in signal level is detected by the abrupt tool break logic. Another embodiment uses the gain command output by a software AGC and generates a break detected signal directly, without resetting the gain command, as gain rises above a high gain alarm level which is recalculated at the start of each cut.

20 Claims, 11 Drawing Sheets

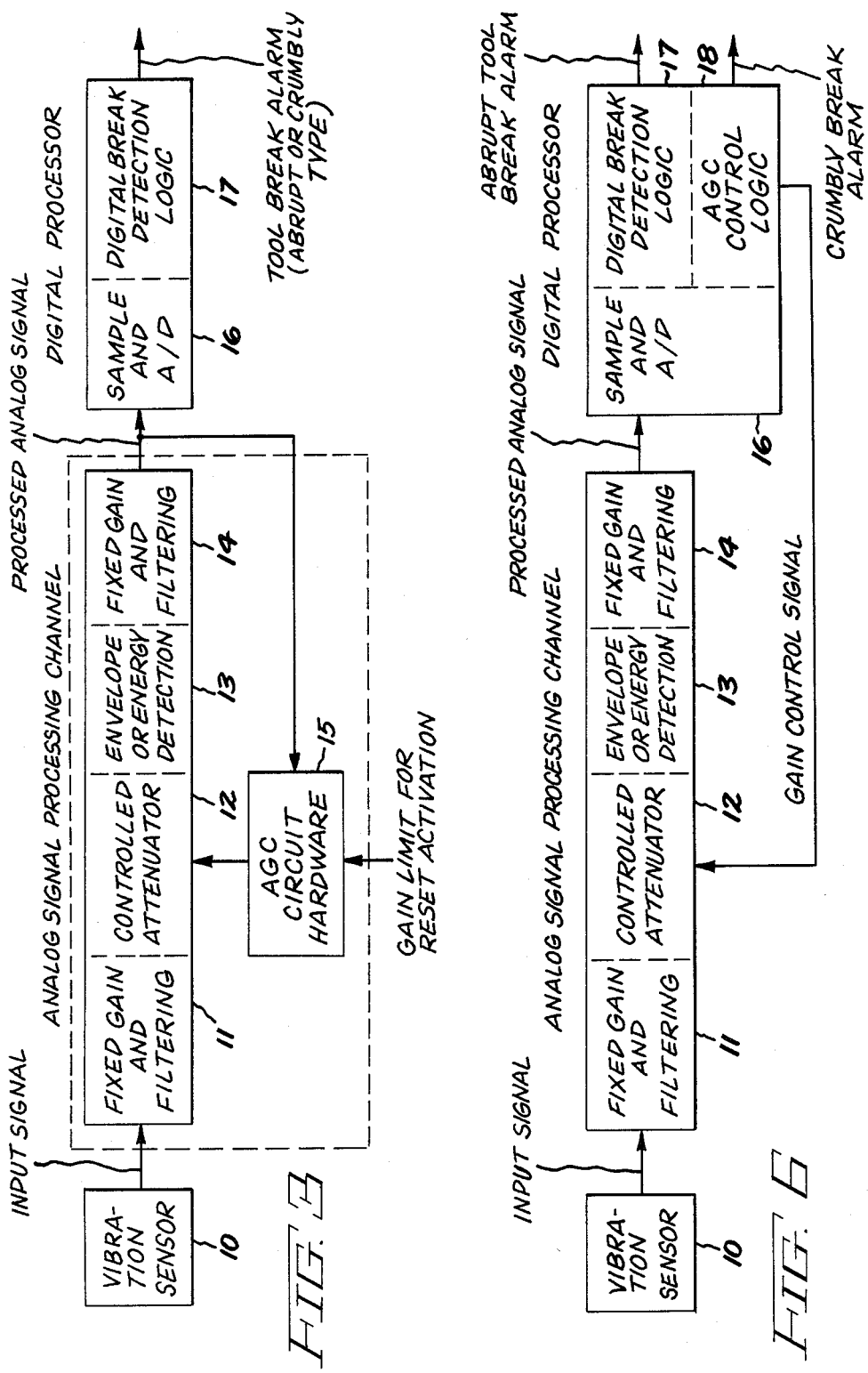

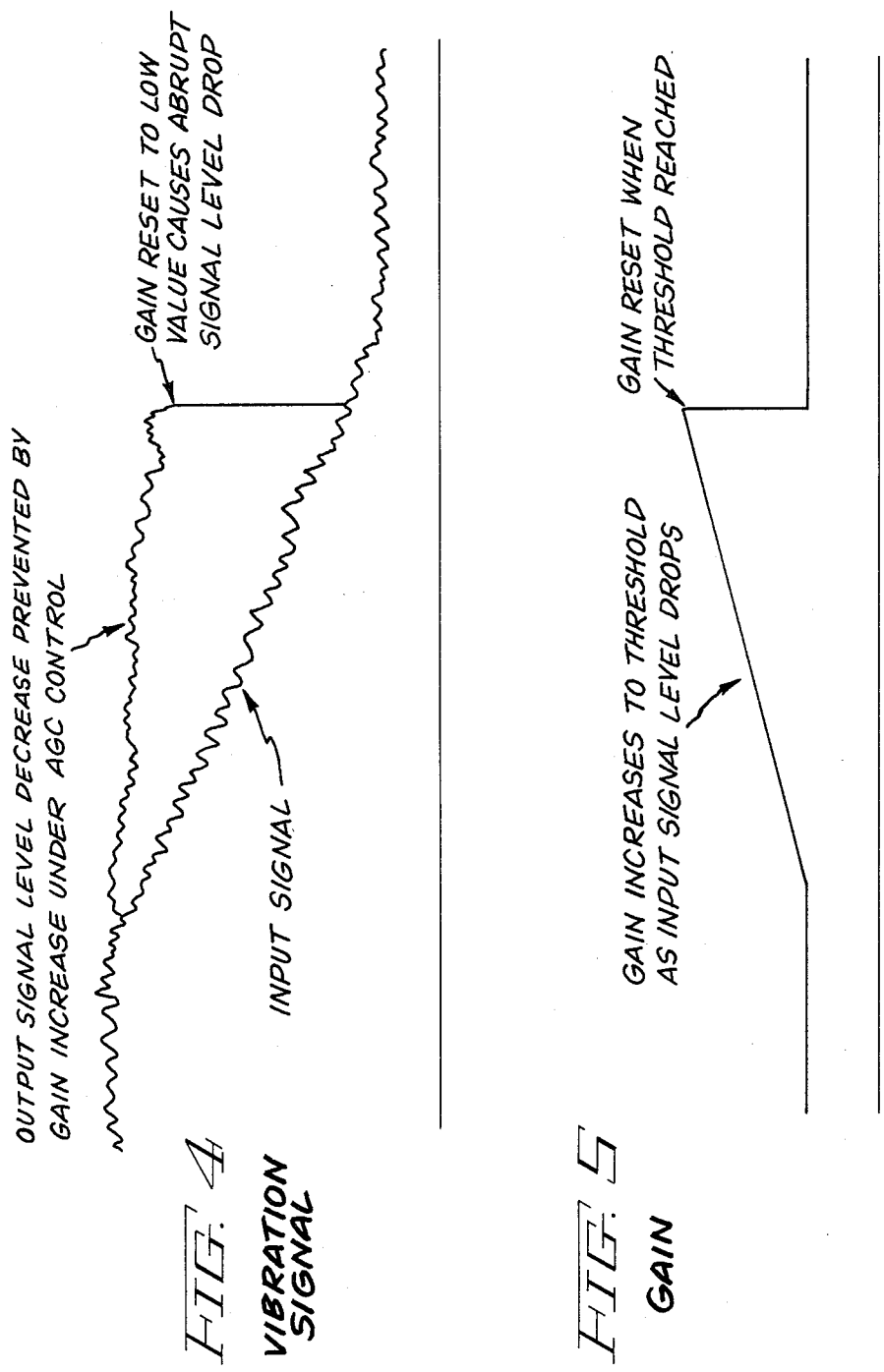

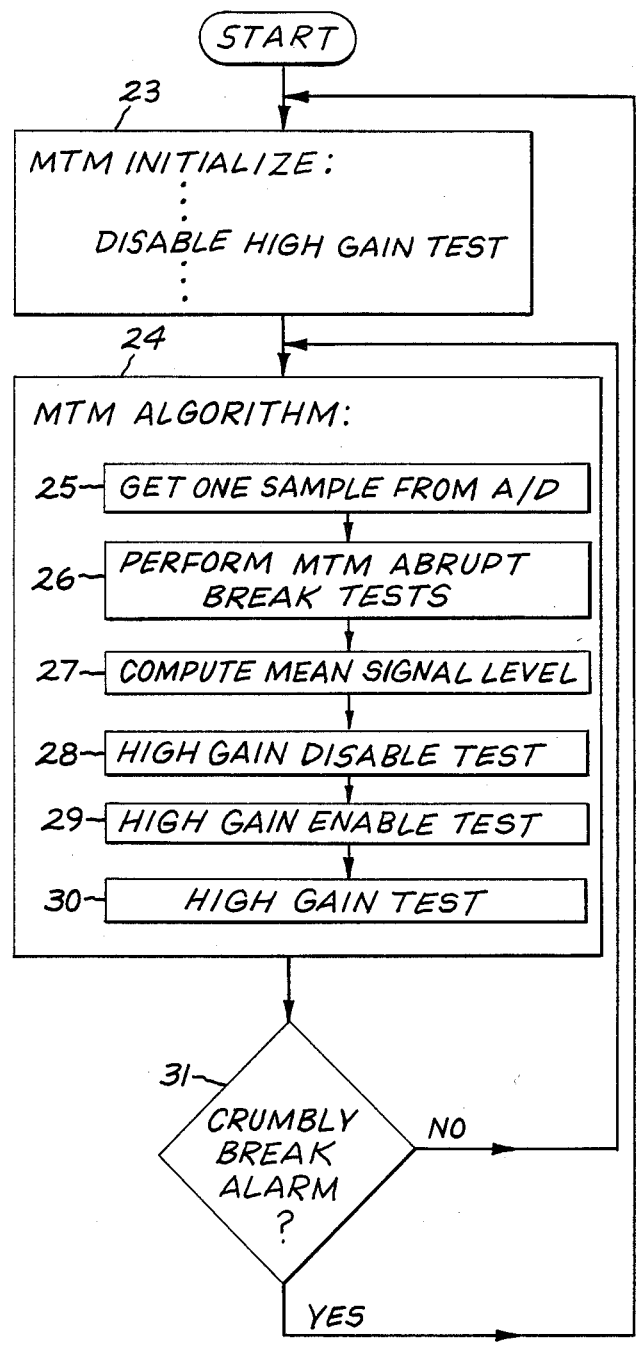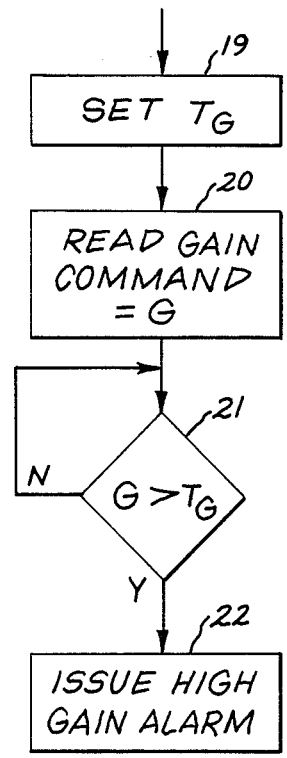

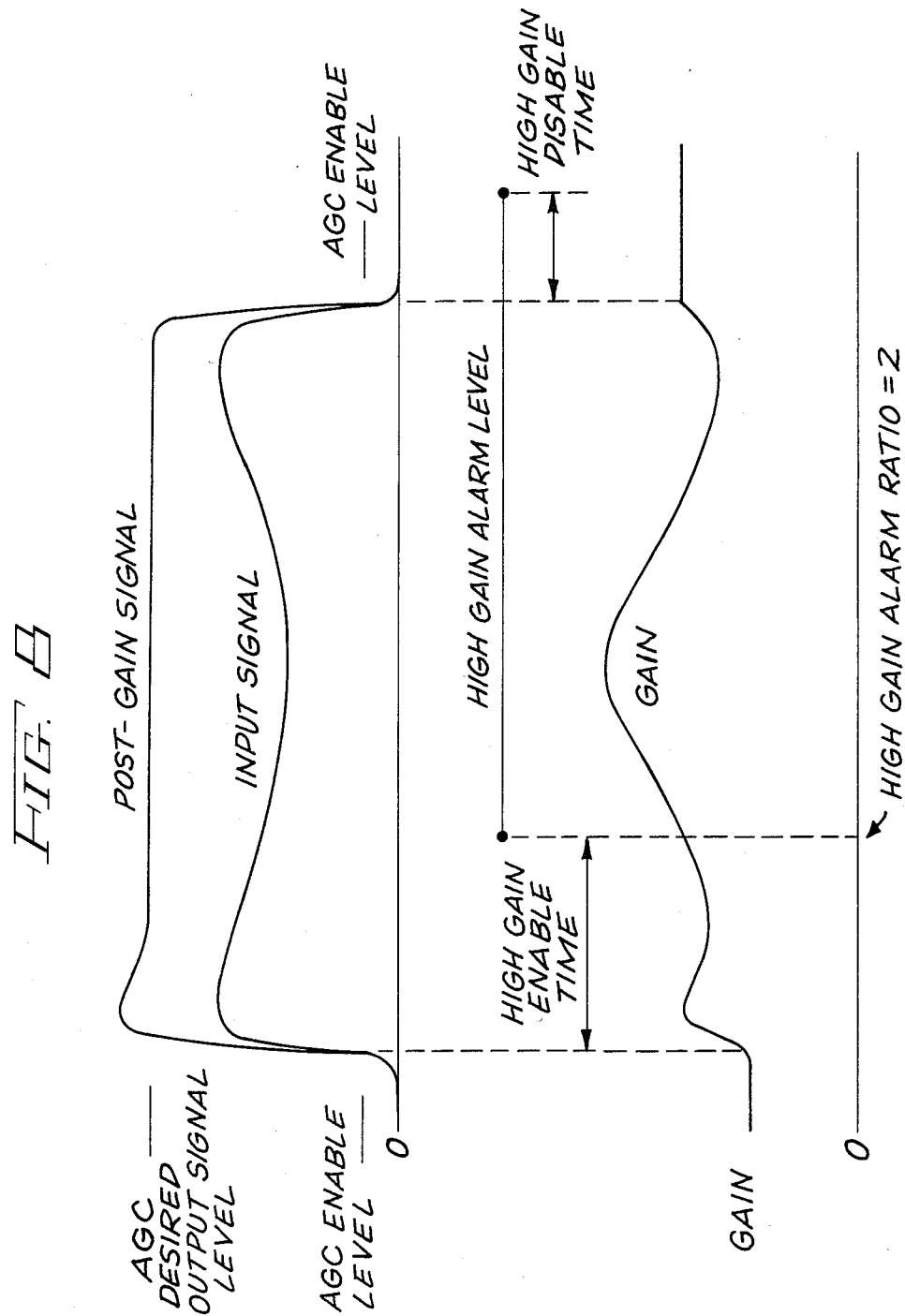

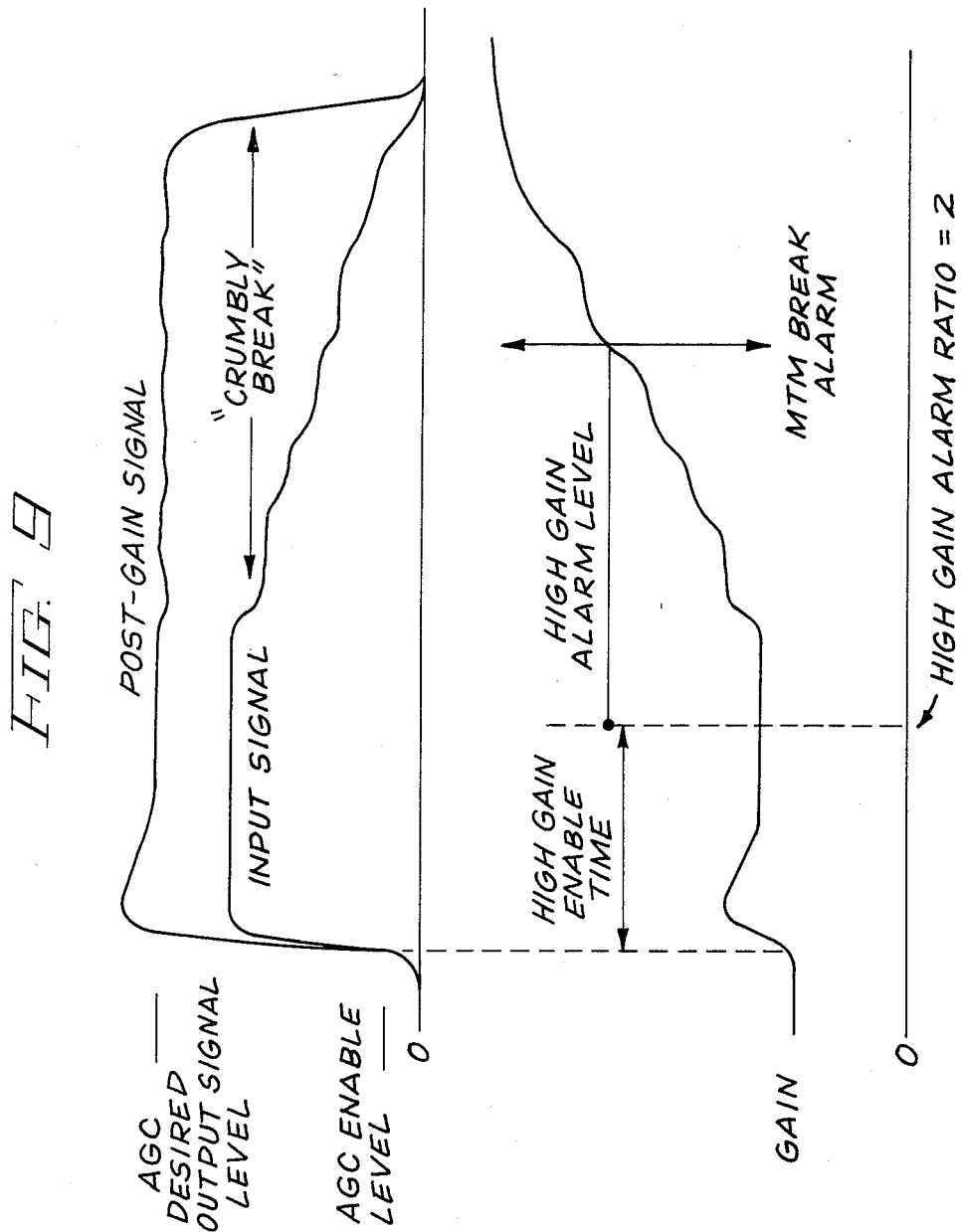

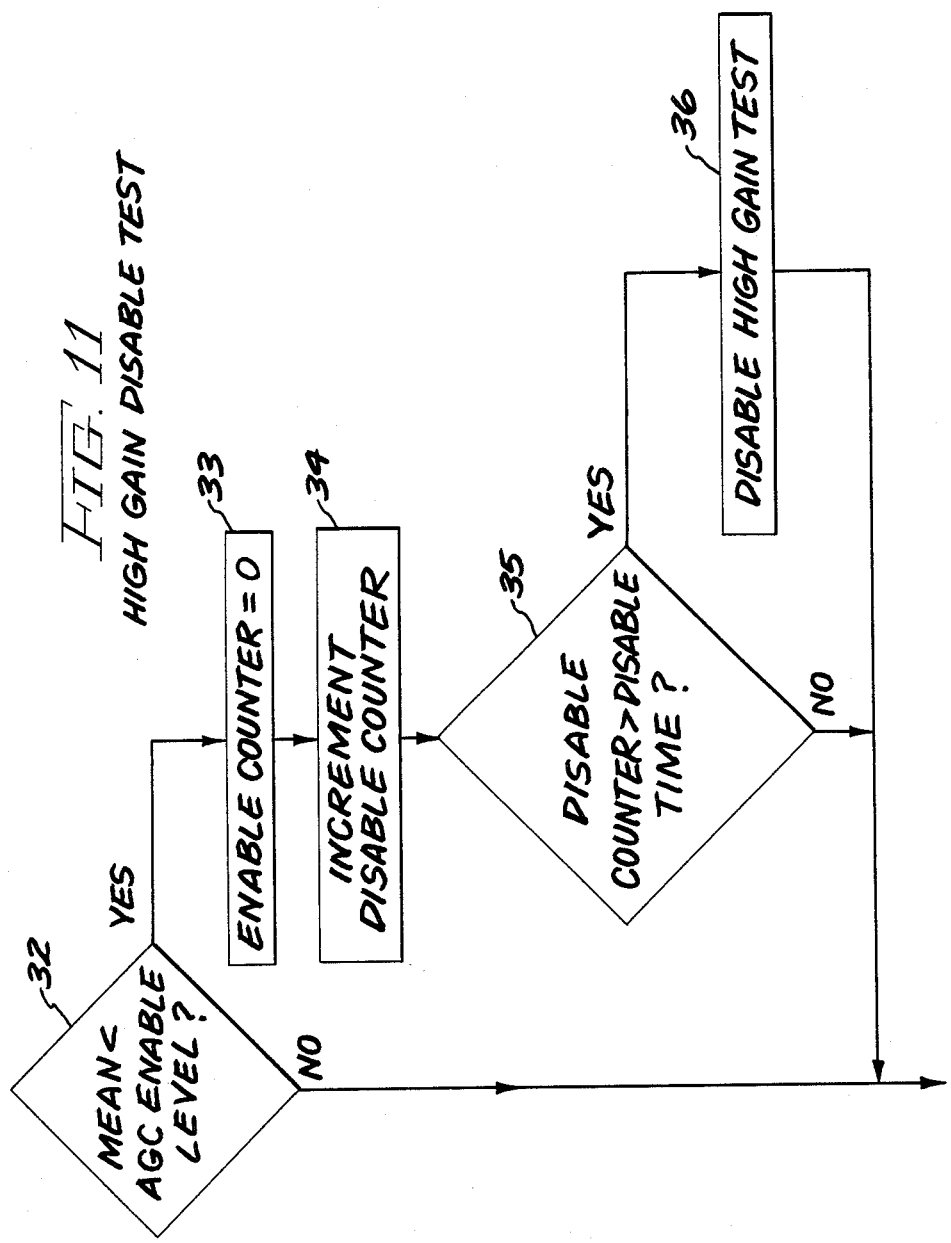

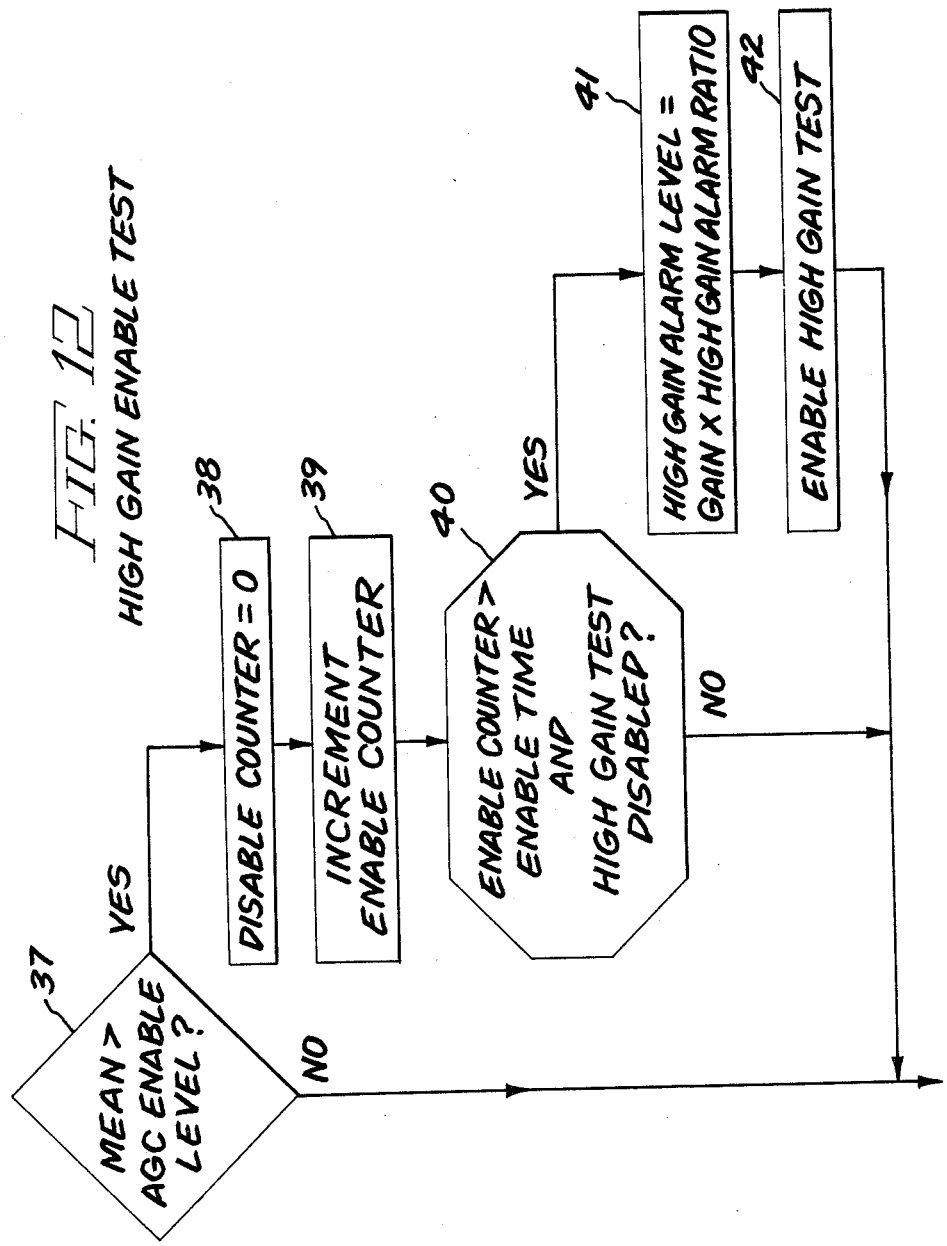

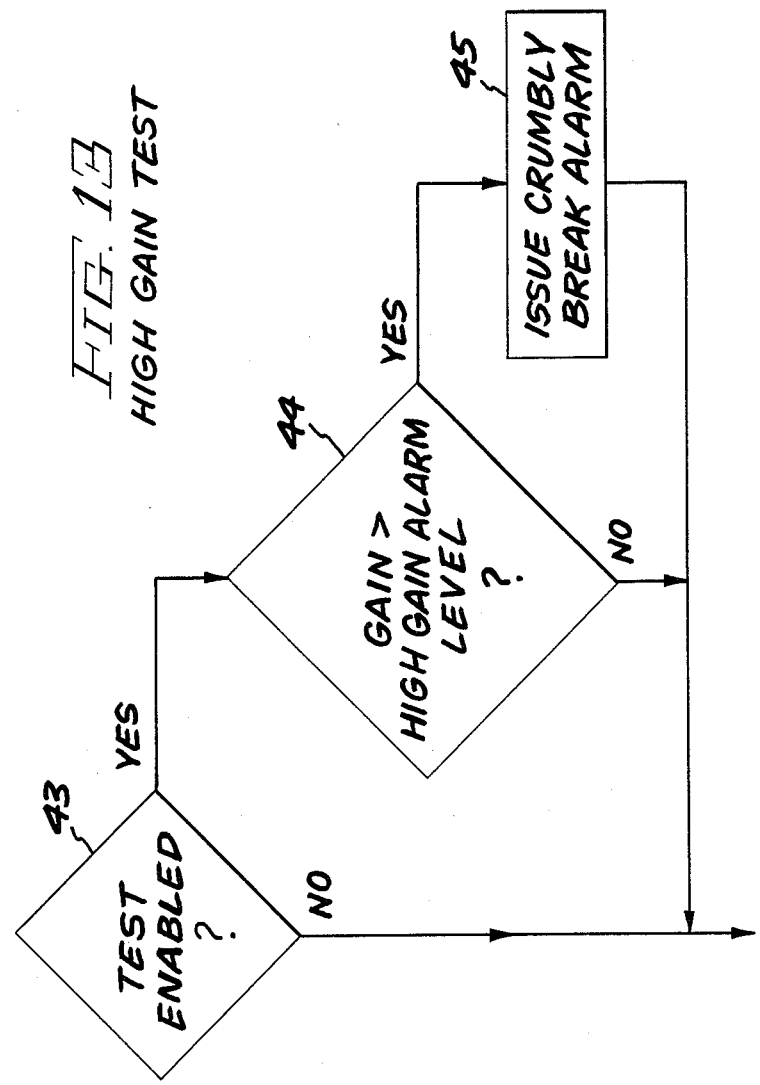

DETECTION BY AUTOMATIC GAIN CONTROL FEATURES OF GRADUAL CUTTING TOOL BREAKAGE

BACKGROUND OF THE INVENTION

This invention relates to an acoustic tool break detection method and system having an automatic gain control to adjust the cutting vibration signal to an average level, and especially to detection via AGC features of tool breaks that cause the cutting vibration signal level to slowly decrease.

A Machine Tool Monitor in a given installation has a cutting noise signal level that can vary widely due to such factors as workpiece material properties, depth of cut, surface speed, feed rate and rake angle. One current system relies on the part programmer to control the gain of the MTM analog signal channel between cuts so that the signal level remains in the general vicinity of the level that tests have shown optimizes tool break detection performance. The digital processor has signal pattern recognition logic to test for characteristic tool break acoustic signatures.

To reduce the burden on the part programmer, and to permit gain control during each cut, an AGC capability has been developed for the Machine Tool Monitor. A software digital automatic gain control is disclosed in copending application Ser. No. 027,367, filed Mar. 18, 1987, B. A. Green, Jr., and a hardware AGC circuit is in Ser. No. 943,397, filed Dec. 19, 1986, now U.S. Pat. No. 4,764,760, J. F. Bedard and W. Whipple. The latter teaches that the AGC time constant is made long enough, such as greater than 3 seconds, so that the rapid substantial changes in vibration signal level due to abruptly occurring tool fracture events, major enough to cause damage or force a recut, are not affected and these acoustic signatures can still be recognized by the tool break detection logic. However, as seen in FIG. 2, there is another type of tool break acoustic signature. The gradual signal level changes produced by a rapidly wearing tool or a crumbly break, which occur over a period of several seconds, are essentially removed by the AGC action if the input signal decreases steadily without abrupt drops. Consequently, no possible tool break detection logic applied to the AGC-modified signal could be successful in this case. Other crumbly type break events reduce the input signal level in a series of unevenly spaced abrupt but small drops no one of which meets the standard tool break detection logic requirements. This invention detects both variations of major tool break events that occur over a period of time rather than suddenly The following are directed to tool break detectors in MTM systems that do not have an analog channel automatic gain control and alarm on detecting the more gradually occurring tool breakage: U.S. Pat. No. 4,642,617, the disclosure of which is incorporated herein by reference and application Ser. No. 835,698, filed Mar. 3, 1986, now U.S. Pat. No. 4,707,688 C. E. Thomas.

U.S. Pat. No. 4,514,797 is relevant and has a software-controlled automatic gain control in a worn cutting tool detector.

SUMMARY OF THE INVENTION

An object of the invention is to provide an improved method and system to detect tool break vibration signatures produced by tool failures that do not occur abruptly.

Another object is to accomplish the foregoing with an approach that does not have to be disabled to avoid false alarms on metal-to-air tool path transitions called for by the part program.

Yet another object is to accomplish both of the above objects when the gain of the MTM analog signal channel is under the control of either a hardware or software AGC system.

A further object is the provision of crumbly break detection logic that is compatible with automatic gain control and correctly responds to normal beginning and end of cut acoustic signatures.

One embodiment of the invention has the hardware AGC and uses an AGC preset gain control feature to produce an abrupt level drop of vibration signal when the gradual decrease of the vibration sensor signal causes it to fall below a threshold. The resulting level drop can be detected by the abrupt tool break detection logic. The improved machine tool monitor is comprised of an analog signal processing channel to condition the cutting vibration signal which has a variable attenuator to control channel gain, and a digital processor and slow AGC circuit as already described. Means are provided to detect the high gain which results through AGC action as a gradually occurring tool break causes the input signal to slowly decrease, and to reset gain to a low level, resulting in the rapid sustained signal level change that is recognized by the break detection logic. The upper limit on gain which triggers reset is selectable and depends on cutting conditions; it can be a given factor times nominal full-cut gain.

The preferred embodiment employs the software or firmware AGC and detects the gradual tool break signature by directly generating a break alarm when the falling input signal causes the AGC to increase the analog channel gain to a high gain threshold which may be user-set or recalculated at the start of each cut. The improved MTM to detect abrupt and gradual tool breakage is comprised of the sensor and analog channel as described, and a digital processor having abrupt tool break detection logic and automatic gain control logic; the latter determines an attenuator gain command to hold the analog channel output signal at the chosen average level Gradual break logic monitors the gain command and issues a break detected signal upon the gain rising to and crossing the high gain alarm level. Preferably the gradual break logic has means to compute the alarm level during each cut by capturing current gain after gain has stabilized and multiplying by a given ratio.

Another aspect of the invention is an improved method of detecting broken tools by monitoring vibrations at the tool-workpiece interface. The analog channel output is digitally processed in break detection logic to search for signal patterns indicative of a major tool break event. The channel gain is automatically controlled and the AGC time constant is long enough that abrupt and persisting signal level changes due to tool fracture events are unaffected and trigger an alarm. The crumbly-type tool break that causes the vibration signal to slowly decrease is detected as the channel gain crosses a selectable high gain threshold as AGC action increases the gain. The high gain alarm level is recalculated for each cut as just described, and the high gain test to compare gain with the alarm level is enabled. The high gain test is disabled at a given time after end of the cut. The time intervals to capture current gain and compute the alarm level, and to disable the high gain test, may be measured from rise and fall of the signal level above and below the AGC enable level.

BRIEF DESCRIPTION OF THE DRAWINGS

FIG. 3 is a block diagram of a tool break detection system which has a hardware AGC and alarms on both abrupt and/crumbly breakage.

FIG. 4 illustrates the AGC operation to maintain the analog output signal at an average level until gain reset causes an abrupt decrease in signal level FIG. 5 shows the increase in gain as the input signal level drops until a threshold is reached and gain is reset.

FIG. 6 illustrates a second form of the invention and a system that has a software AGC and detects both types of tool breakage.

FIG. 7 is a flowchart illustrating the monitoring of gain and issuance, of a high gain alarm upon reaching a user-set threshold.

FIG. 8 shows typical input and post-gain vibration signals and gain adjustments during normal cutting, and procedures for enabling and disabling High Gain Test and for setting High Gain Alarm Level.

FIG. 9 shows the signals and gain during a crumbly break and issuance of a break alarm.

FIG. 10 is a simplified flowchart of the MTM signal processing and break detection algorithm.

FIGS. 11-13 are flowcharts of the High Gain Enable and Disable Tests, and the High Gain Test.

DETAILED DESCRIPTION OF THE INVENTION

Figure 1:
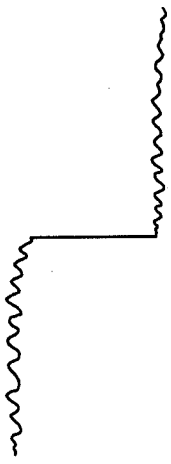
FIG. 1 shows the typical acoustic signature of an abruptly occurring major tool break event
Figure 2:
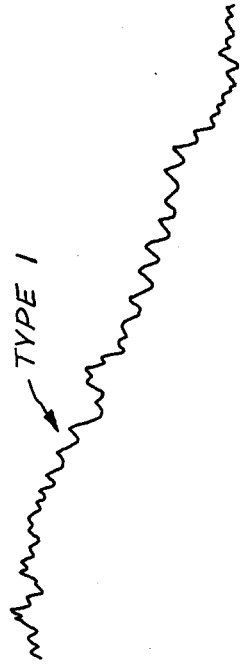
FIG. 2 shows the characteristic acoustic signatures of two types of gradual tool breaks that cause the cutting vibration level to slowly decrease

The standard Machine Tool Monitor tool break detection logic, applied to the digitized output signal of the analog signal channel, recognizes tool break acoustic signatures by looking for characteristic signal level changes that meet certain criteria as to abruptness, amount of change, and persistence. Most tool fracture events that significantly alter metal-cutting conditions meet these criteria and are detected by this logic. Typically a portion of the insert including the original cutting edge breaks away and there is a decreased cutting noise signal level due to a reduced depth of cut. The drop in signal level is rapid and completed in approximately one millisecond; the shift in signal level persists for at least one workpiece revolution. One such vibration signature is given in FIG. 1. Other types of tool break events have been found, however, that occasionally produce gradual decreases in signal level, requiring a second or more to reduce the signal level by half and several seconds to reduce it to the air-cutting level. Two types of gradual decrease tool break signatures that have been encountered are shown in FIG. 2. In type 1 the, mean signal level decrease is continuous or nearly continuous; this may result from a crumbly break and there is a gradual change in cutting conditions. In type 2 the signal level decreases in a series of widely and non-uniformly spaced small abrupt steps, such as may result from a series of small breaks producing small abrupt changes in cutting conditions.

Crumbly breaks or "rapid wear" tool break events are not generally detected by the standard MTM tool break detection algorithm. Furthermore, the addition to the MTM analog processor of a slow automatic gain control capability will tend to obscure the gradual signal level change, since AGC will increase system gain to hold the output signal level constant as the input level slowly decreases One form of the invention shown in FIG. 3 has a hardware automatic gain control circuit and uses a selectable upper limit on channel gain and abruptly resets gain to a lower value when it reaches the upper limit under the control of the AGC action. This sudden decrease in channel gain produces a corresponding decrease in signal level that is abrupt enough and persistent enough to meet the standard MTM abrupt tool break detection criteria The Machine Tool Monitor according to one implementation has the following components. A broadband vibration sensor 10 such as an accelerometer is mounted on the machine tool, for instance a lathe or milling machine, in a location with good coupling to vibrations generated by the interaction of the cutting tool and workpiece. The output of one accelerometer is a low level AC analog signal with frequency content between approximately 0–70 KHz, and amplitude that varies with the strength of the vibrations caused by the cutting process. The input signal to the analog signal processing channel is fed into a fixed gain and filtering section 11. The dynamic range of the electronics is matched to the accelerometer and the frequency range is restricted to 30 KHz–70 KHz by a bandpass filter. Low frequencies are attenuated to reduce interference from various machine noise sources, and high frequencies are not used as they are strongly attenuated unless the sensor is close to the tool holder. The gain of the analog channel is controlled by an attenuator 12 that can produce a chosen relative channel gain factor in accordance with the digital control signal it receives. The envelope or energy detection and fixed gain and filtering sections 13 and 14 are comprised of a full wave rectifier and a 500 Hz or less low pass anti-aliasing filter (there is a fixed gain associated with the filtering). The processed analog output signal is typically a 0 to 10 volt, DC to 500 Hz bandwidth signal.

For dynamic range considerations, the hardware ACG circuit 15 controls attenuator 12 and the channel gain to keep the mean signal level out of the analog channel in the vicinity of 1 volt. As was previously explained, the AGC time constant is made long enough that the rapid sustained change in signal level due to a major tool fracture break event is unaffected. The digital processor is comprised of a sample and analog-to-digital converter section 16 and digital break detection logic 17. The analog channel output voltage is sampled and digitized and the signal samples are analyzed by the logic to recognize the abrupt tool break vibration signature, and generate a tool break alarm. Either the abruptly occurring or the more gradually occurring, crumbly type tool break generate an alarm. In order to detect the crumbly tool break, AGC circuit 15 is modified to have a gain limit for reset activation.

Referring to FIGS. 4 and 5, assume that a crumbly type tool break takes place and the cutting vibration signal level slowly decreases. An output signal level decrease is prevented by the gain increase provided under AGC control. An upper limit on AGC-controlled channel gain is selected and depends on the cutting conditions; it may be some factor, for instance in the range from 1.5 to 5, times the nominal full-cut channel gain. The gain increases toward the high gain threshold as the input signal level drops, and crossing the threshold causes the gain to be reset to a low value and produces an abrupt signal level drop that is sustained and recognized by break detection logic 17 as a tool break that triggers the alarm. The low value to which the gain is reset may be the preset constant gain presented to attenuator 12 when the analog channel output voltage is below the predetermined AGC enable level.

The preferred form of the invention illustrated in FIG. 6 has a software automatic gain control system, and software logic detects the high gain threshold crossing and generates the break detection signal without resetting the gain command. The vibration sensor, analog signal processing channel, and digital processor are as before, except that the digital processor now has AGC control logic 18 to which the digitized channel output signal is presented. The AGC logic determines a gain command for attenuator 12 to hold the channel output signal at the chosen average level, with an AGC time constant long enough that the abrupt tool break signature is detected and triggers an alarm. Gradual break logic monitors the gain command and issues a break detected signal upon the gain rising to a high value and crossing a threshold. There are two alternative methods for determining the high gain threshold, whose crossing by the gain control signal results in a crumbly tool break alarm. The first has the part programmer or user set in a threshold which depends on the current cutting conditions. This may be an integer multiple of the nominal full-cut channel gain. The other has the software capture a reference gain after a given time into the cut and compute the threshold as a user-selected factor times the reference gain. Both methods can be in the microcomputer assembly language software as part of the tool break detection software FIG. 7 illustrates gradual break detection by the first method and logic to monitor the gain and issue a high gain alarm. The high gain threshold $T_G$ is set at 19 and the current gain command G is read at 20. If the current gain is not greater than the high gain threshold the comparison continues at 21 until current gain rises to and crosses the threshold and a crumbly break high gain alarm is issued at 22. If the gain command required to hold the digital output signal at the chosen average level rises to the alarm level, it means the signal input to the analog channel has decreased and has done so slowly enough that the AGC system with its time constant can track the input signal level change. Thus, the system can detect the slow decay of signal level associated with crumbly tool breaks, while ignoring the more rapid signal level drops associated with normal ends of cut. The automatic gain control does not react to these fast signal level drops, which cause the signal level to decrease below the AGC enable level before the slow automatic gain control can increase the channel gain. Once the signal level gets below the AGC enable level the AGC is no longer active.

The preferred system and method for detecting crumbly breaks illustrated in FIGS. 8–13 is compatible with automatic gain control and requires little or no adjustment by the part programmer. FIG. 8 shows the method by which the High Gain Test, comparing current gain to the high gain threshold or alarm level, is enabled and disabled during the course of a normal cut. FIG. 9 illustrates the method by which an MTM break alarm is issued when a crumbly tool break occurs. In the figures the variation of gain as the input signal changes in order to hold the post-gain signal at the desired output signal level (1 volt) is depicted. The AGC Enable Level is a parameter associated with the AGC algorithm and now also is used in the high gain alarm algorithm. When the vibration signal is below the AGC Enable Level (e.g., when not cutting metal), AGC action is suppressed. The AGC Enable Level, if set to a suitably low value, allows the AGC to maintain a uniform signal level during all metal cutting, but prevents the gain being driven abnormally high during non-cutting periods.

A High Gain Alarm algorithm with parameters High Gain Enable Time, High Gain Disable Time, and High Gain Alarm Ratio s introduced. The enable and disable times are measured from the rise of the input signal above the AGC Enable Level, and its fall below the same, but may be measured from some other convenient point at the start and end of the cut. The High Gain Test is disabled and enabled as follows:

When the MTM algorithm is initialized or reinitialized, disable the High Gain Test.

After an MTM tool break alarm, and whenever the mean signal level is below the AGC Enable Level for High Gain Disable Time consecutive samples (e.g. during the lull at the end of a cut), disable the High Gain Test.

If the mean signal level is above the AGC Enable Level for High Gain Enable Time consecutive samples and the High Gain Test is disabled, then set the High Gain Alarm Level equal to current gain multiplied by the user-selected High Gain Alarm Ratio (for example, 2) and enable the High Gain Test. The latter, the condition under which a crumbly break alarm is generated, more precisely is: when the gain exceeds the High Gain Alarm Level, issue an MTM break alarm. A value of zero for the High Gain Enable Time should permanently disable the High Gain Test, allowing the part programmer the freedom of operating without this gradual break detection mode. The High Gain Alarm Level is an internal parameter, not visible to the part programmer.

FIG. 8 illustrates the procedure followed during a normal cut without a tool break. At the end of High Gain Enable Time the High Gain Test is enabled. Gain never increases so high during the cut that the High Gain Alarm Level is reached. At the end of the cut, after the signal level drops below the AGC Enable Level and expiration of High Gain Disable Time, the High Gain Test is disabled. On the other hand, when there is a crumbly break during the cut, FIG. 9 shows that AGC action causes gain to increase to a high value and cross the High Gain Alarm Level, and a crumbly break alarm is issued. The High Gain Test is now disabled.

For proper operation, the High Gain Enable Time is set sufficiently long, such as several times the AGC time constant, that the gain is stable when the High Gain Test is enabled. The programmer need have no knowledge of the actual gain value; the alarm condition is specified as the High Gain Alarm Ratio, a measure of the relative change in the vibration signal due to a crumbly break. The High Gain Test disable and enable conditions are designed so that the High Gain Alarm Level is recalculated at the start of each cut, thus automatically compensating for changes in process parameters (spindle speed, depth of cut, etc.). The High Gain Disable Time may be related to workpiece revolution time, and conveniently is a multiple of the time for one revolution.

The AGC time constant is set greater than the time constant of a normal end of cut so that the mean signal level drops below the AGC Enable Level before AGC action boosts the gain above the High Gain Alarm Level. For a similar reason the AGC time constant must be set less than the time constant of a crumbly break These constraints are not severe; in practice, one value for the AGC time constant should be appropriate for all machining conditions.

These procedures to detect a gradually occurring tool break, implemented in software or firmware in the digital processor, are reviewed and further explained with reference to the simplified flowcharts in FIGS. 10-13. Block 23 in FIG. 10 does not give the details of the MTM initialization algorithm except that one step is Disable High Gain Test. The MTM algorithm in block 24 has standard steps 25-27 which are get sample from A/D converter 16, perform the abrupt break tests in break detection logic 17, and compute the running mean signal level using at least two and up to 256 signal samples. The High Gain Disable Test 8, High Gain Enable Test 29, and High Gain Test 30 are illustrated in FIGS. 11-13. If at step 31 a break alarm is not issued the MTM algorithm is repeated as each new signal sample is acquired. The issuance of a crumbly break alarm disables the High Gain Test.

In FIG. 11, the High Gain Disable Test comprises, at steps 32-36, determining that the mean analog output signal level is below the AGC Enable Level, setting a disable counter to zero, incrementing an enable counter by one count per sample, determining that the disable counter is greater than the disable time (measured in consecutive samples), and disabling the High Gain Test. If the mean is higher than the AGC Enable Level, or the High Gain Test is disabled, proceed to the High Gain Enable Test in FIG. 12. Steps 37-42 show that when the mean analog output signal level is greater than the AGC Enable Level, the disable counter is set to zero and the enable counter is incremented one unit. If the enable counter is greater than Enable Time and the High Gain Test is disabled, the High Gain Alarm Level is calculated (current gain times the preassigned alarm ratio), and the High Gain Test is enabled Steps 43-45, FIG. 13, depict the High Gain Test, that a crumbly break alarm is issued if the current gain exceeds the High Gain Alarm Level. On the other hand, if the mean vibration signal is less than the AGC Enable Level or the conditions in block 40 are not satisfied, proceed directly to the High Gain Test and hence, at step 43, sequence through the MTM algorithm again.

Hardware AGC

Figure 14:
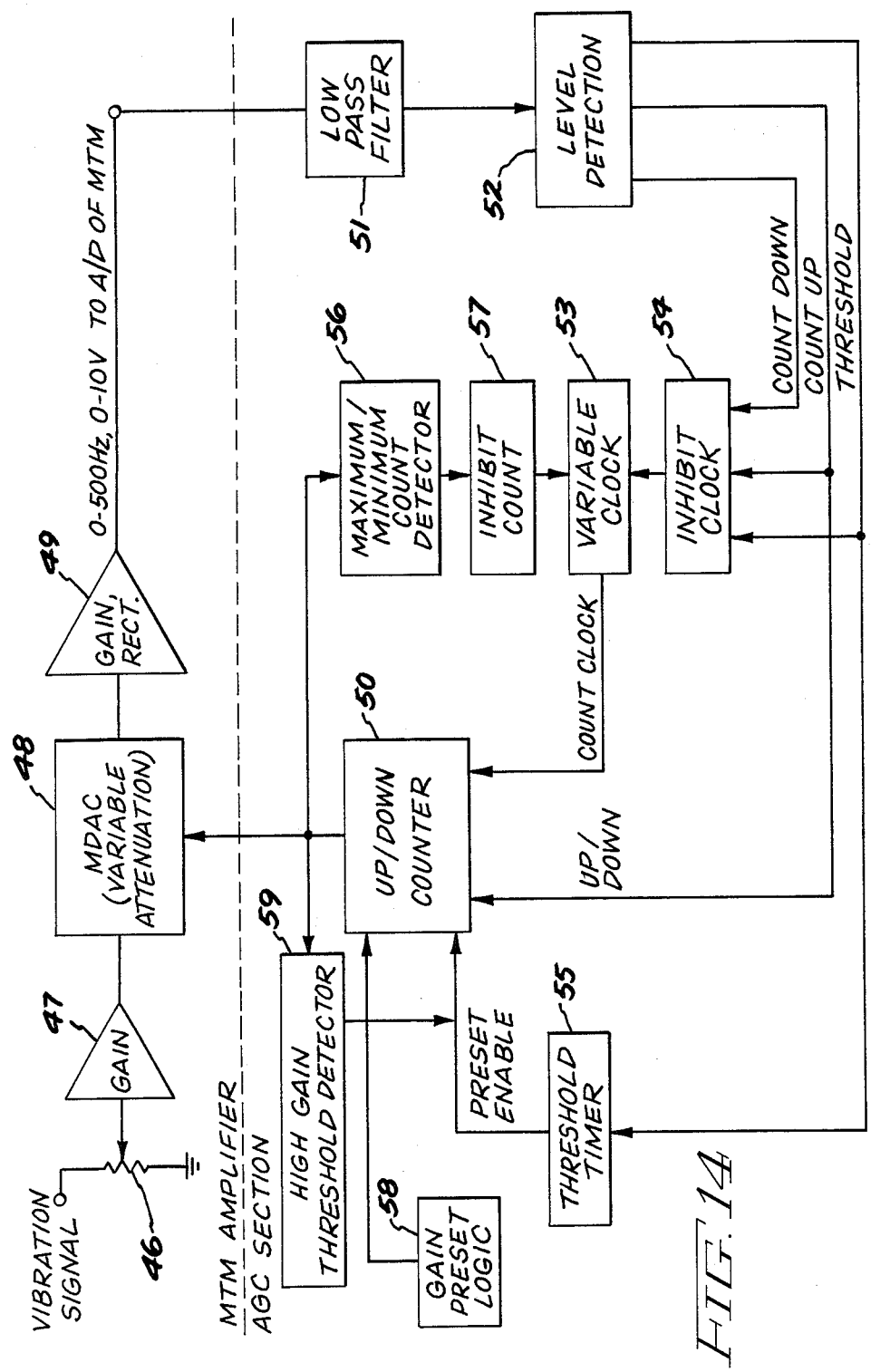
FIG. 14 is a detailed block diagram of the hardware AGC in FIG. 3.
Figure 15:
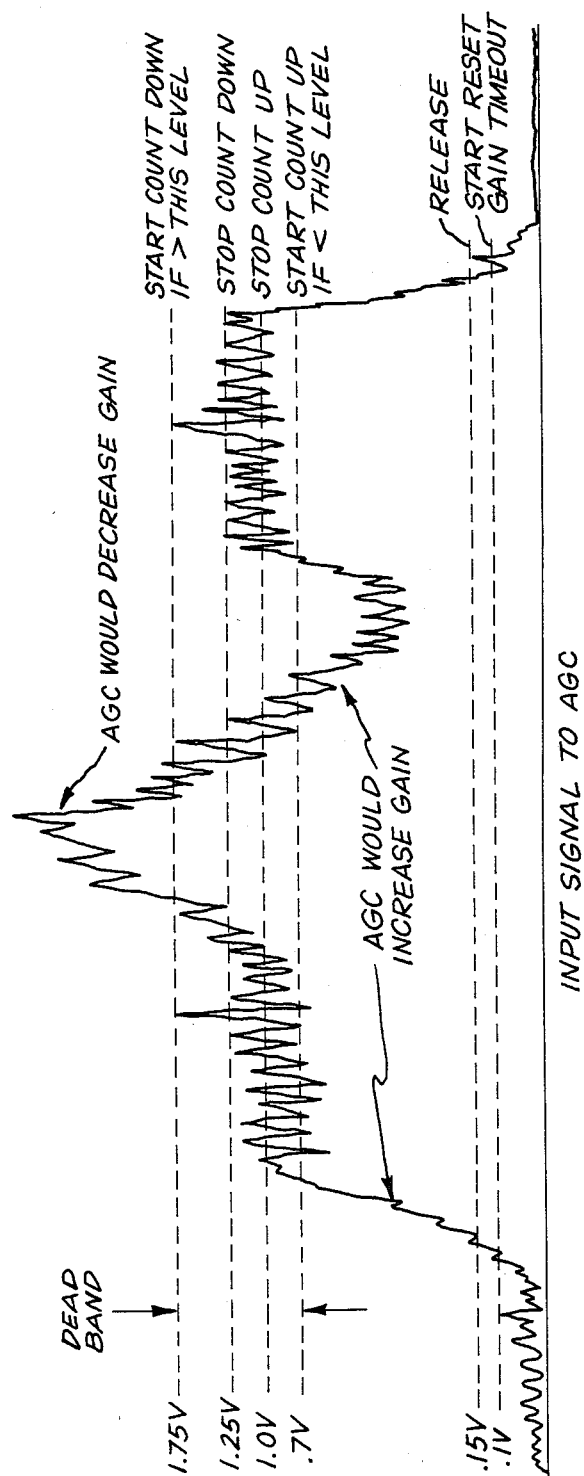
FIG. 15 shows the action of the hardware AGC as a function of input signal level.

This is described in copending application Ser. No. 943,397, filed Dec. 19, 1986, J. F. Bedard et al, "Automatic Gain Control for Machine Tool Monitor", the disclosure of which is incorporated herein by reference. FIGS. 14 and 15 are taken from that application with the exception that the system block diagram in FIG. 14 is modified to have a means to detect a high gain threshold and rapidly reset gain to a lower value. As there shown, the vibration signal from an accelerometer is passed to an input potentiometer 46 to match the dynamic range of the electronics to the sensor. The MTM analog amplifier to condition this signal to a 0 to 10 volt, DC to 500 Hz signal has a fixed gain section 47, a multiplying digital-to-analog converter 48 serving as the variable attenuator, and a section 49 representing the fixed gain and rectification functions. The gain of digitally programmable MDAC 48 is adjusted by setting its binary inputs via signals from the parallel outputs of an up/down counter 50, determining the gain of the analog amplifier channel.

The AGC circuit is comprised of an input filter 51 and level detector 52, a variable clock 53 and inhibit circuitry 54, a threshold timer 55, maximum/minimum count detector 56 and inhibit count circuitry 57, the presettable up/down counter 50, and preset logic 58. FIG. 15 illustrates the action of the AGC as a function of input signal level. The voltages at the left at which various actions are taken are for one application of the MTM. The count up and count down commands refer to counter 50; counting down decreases analog amplifier gain (more attenuation) and counting up increases gain (less attenuation). The threshold voltage to release the AGC is above the machine tool background level noise. There is a dead band or window where no action is taken by the AGC.

The analog channel output signal is input to the AGC through a 100 Hz low pass filter 51 which provides initial signal averaging. This signal is applied to the level detector 52 which provides three control signals - count up, count down, and threshold. If the signal is below threshold for a time (1 second) set by threshold timer 55, channel gain is held at a preset low value determined by gain preset logic 58. It may be set from the remote MTM digital processor, either manually or by the part program. When the signal level exceeds threshold (0.15 volts) and is not within the window (0.7 to 1.75 volts) the count up or count down signal activates up/down counter 50 and variable clock 53, The clock output, whose rate is dependent on the counter outputs, drives the counter until the signal level is within the desired window or the counter reaches maximum or minimum output. When this occurs, the clock is inhibited. There is hysteresis for the window function and noise rejection at threshold. The variable clock 53 is needed to allow the MTM abrupt break algorithm to work without modification from its original criteria. The AGC changes gain at a substantially constant rate such that a 2:1 gain change from 512 to 256, for instance, takes the same time as one from 24 to 12. The time rate at which the AGC changes gain is constant and independent of gain; it is set such than a 2:1 gain change takes longer than the abrupt tool break confirmation period.

In order to detect crumbly tool breaks that occur over a period of time rather than suddenly, high gain threshold detector 59 is provided. Attenuator gain and the output of up/down counter 50 are monitored; at a selectable upper threshold on attenuator gain the preset enable of the counter is enabled and the gain is preset to a low value. The resulting level drop in the channel output signal is detected by the standard abrupt tool break detection logic.

Software AGC

The following is abstracted from copending application Ser. No. 027,367, filed Mar. 18, 1987, B. A. Green, Jr., "Rapid Method of Digital Automatic Gain Control", the disclosure of which is incorporated herein by reference. The controlled attenuator may be a multiplying digital-to-analog converter which has an analog input x, a digital input G, and an analog output proportional to the product Gx of the two inputs. The analog output is sampled at a suitable rate and converted to digital value X by the A/D converter. The object of the digital automatic gain control is to adjust G continually and automatically to keep the long-term value of X at a desired average level L. Let T be a positive integer constant representing the selected time constant for exponential averaging, expressed in units of the sampling period. Then the object is to adjust G periodically to keep the exponential average of X (with time constant T) at level L.

The rapid method of digital AGC and of adjusting gain G in each cycle is implemented with additions and subtractions and there are no multiplications and divisions. Let N be the smallest integer such that the product NT is greater than or equal to the maximum permitted value of G. If T is greater than or equal to the maximum permitted value of G, N is unity. Arbitrary integer variable A is defined as the accumulated difference over a number of sampling periods between the digitized channel output signal X and the desired average output level L. Arbitrary integer variable B changes by current gain G when the magnitude of A becomes greater than L; gain G is changed by N when the magnitude of B becomes larger than NT. Variable A changes at every cycle while B does not change at regular intervals or at every cycle. In the machine tool monitor of FIG. 6, typical values are that gain is a positive integer less than 1024, and the time constant is a positive integer between, for instance, 500 and 8000. If the typical time constant is 0.25 sec to 4 sec, with an A/D converter having a sampling rate of 2000/sec, the time constant expressed in sampling periods is as given. The constant N is the smallest amount by which gain is changed. At a time constant greater than 1024, N is 1. The digitized output signals are positive integers less than 4096 (2.5 millivolts per unit). The desired average output level is 1 volt or 400 in the computer. All other variables are 2-byte integers having values between $-32768$ and $+32768$.

Initially variables A and B are set to zero or another initial value. The values of constants N, NT, L, $-NT$ and $-L$ are determined and stored at the start of the process; L and T are selected and the others computed. Then in each sampling period a new value of G is determined as follows:

1. Increment A by X.
2. Decrement A by L.
3. If A is now greater than L,
   a. Decrement A by L.
   b. Increment B by G.
   c. If B is now greater than N*T,
      (1) Decrement B by N*T.
      (2) Decrement G by N.
   d. If A is still greater than L, go to Step 3a; otherwise jump to step 5.
4. If A is now less than $-L$,
   a. Increment A by L.
   b. Decrement B by G.
   c. If B is now less than $-N*T$,
      (1) Increment B by N*T.
      (2) Increment G by N.
   d. If A is still less than $-L$, go to Step 4a; otherwise continue to step 5.
5. Return the value of G, retaining the values of A, B, and G for use in the next cycle.

(End of calculation.)

In the typical application in which the average of the signal does not often change greatly in the period of one time constant, steps 3a through 3d (or 4a through 4d) will usually be executed either not at all (if A lies in the range $-L$ to L) or only once per cycle, since A will not often stray outside the range $-2L$ to 2L. In the typical application, therefore, the longest path often taken is through steps 1, 2, 3, 4, 4a, 4b, 4c(1) 4c(2), 4d and 5. This path requires six additions/subtractions and four comparisons. With the addition of the gradual break detection logic in FIG. 7 and FIGS. 8-13, the software logic detects the high gain threshold crossing and generates the crumbly break alarm without resetting the gain command. Reviewing, the analog channel gain is controlled by the AGC to hold the digitized channel output at the desired average level, with a time constant long enough that abrupt and persisting signal level changes due to major tool fracture events are detected and trigger an alarm. Gradually occurring tool breaks that cause the input vibration signal to slowly decrease are detected as the channel gain crosses the high gain threshold as AGC action increases the gain. This threshold depends on the cutting conditions. The AGC control logic and gradual break detection logic may be implemented in firmware.

The following commonly assigned patents on abrupt tool break detection are cross-referenced: 4,636,779 and 4,636,780. These present other types of acoustic signatures characteristic of major abruptly occurring breakage. The patents on gradual tool breaks that occur over a period of time were cited previously.

While the invention has been described with reference to several preferred embodiments, it will be understood by those skilled in the art that the foregoing and other changes in form and details may be made without departing from the spirit and scope of the invention.

The invention claimed is:

1. A machine tool monitor to detect both abrupt and gradual cutting tool breakage comprising:
   a vibration sensor to provide a signal representative of vibrations generated by the interaction of a tool and workpiece during the cutting process;
   an analog signal processing channel which conditions the cutting vibration signal to a unipolar output voltage in a restricted frequency range and has an attenuator to control gain;
   a digital processor comprised of break detection logic to recognize an abrupt tool break vibration signature having a rapid large change in signal level that persists for a given confirmation period, and generate an alarm;
   an automatic gain control (AGC) circuit to dynamically adjust the gain of said attenuator and hold said analog output voltage at a chosen average level, with a time constant long enough that said abrupt tool break signature is detected;
   means to detect a high gain which results through action of said AGC as a gradually occurring tool break causes the input vibration signal level to slowly decrease; and
   means to reset the gain to a low value, resulting in a rapid and persisting change in signal level that is detected by said break detection logic and generates an alarm.

2. The monitor of claim 1 wherein said high gain to trigger reset is selectable and depends on cutting conditions.

3. The monitor of claim 2 wherein said high gain is a given factor times nominal full-cut gain.

4. The monitor of claim 1 wherein said AGC circuit has means to preset gain if said channel output is below a threshold, and said reset means rapidly changes gain to the preset gain.

5. The monitor of claim 1 wherein said attenuator is a digitally programmable multiplying digital-to-analog converter which has binary inputs set by the output of an up/down counter, and said reset means monitors the counter and causes said counter to output a preset gain.

6. A machine tool monitor to detect both abrupt and gradual cutting tool breakage comprising:
 a vibration sensor to provide a signal representative of vibrations generated by the interaction of a tool and workpiece during the cutting process;
 an analog signal processing channel which conditions the cutting vibration signal to a unipolar output voltage in a restricted frequency range and has a digitally programmable attenuator to control channel gain;
 a digital processor to sample and digitize said analog output voltage and analyze signal samples in break detection logic to recognize an abrupt tool break vibration signature having a rapid change in signal level that persists for a given confirmation period, and generate an alarm;
 said digital processor further comprising automatic gain control logic to determine a gain command for said attenuator to hold said channel output voltage at a chosen average level, with an AGC time constant long enough that said abrupt tool break signature is detected; and
 gradual break logic to monitor said gain command and issue a tool break alarm as said gain rises and crosses a high gain threshold due to a crumbly-type tool break that causes said cutting vibration signal to slowly decrease.

7. The monitor of claim 6 wherein said high gain threshold is user-selectable and depends on cutting conditions.

8. The monitor of claim 7 wherein said high gain threshold is a given factor times nominal full-cut gain.

9. The monitor of claim 6 wherein said gradual break logic is comprised of means to compute said high gain threshold during each cut by capturing the current gain during the cut after gain has stabilized and multiplying by a given ratio.

10. The monitor of claim 9 wherein said current gain is captured at a selected time after said automatic gain control is enabled.

11. The monitor of claim 10 wherein said selected capture time is a multiple of said AGC time constant.

12. The monitor of claim 9 further comprising means to disable, at the end of every cut, comparison of current gain with the computed high gain threshold.

13. The method of detecting cutting tool breakage by monitoring vibrations at the tool-workpiece interface, comprising:
 generating a vibration signal and preprocessing the same in an analog signal channel which has a digitally programmable variable gain device to control channel gain;
 digitally processing the analog channel output in break detection logic to search for signal patterns indicative of a major tool break and generate an alarm;
 automatically controlling the channel gain to hold the analog channel output at a chosen average level, with an AGC (automatic gain control) time constant long enough that abrupt and persisting signal level changes due to tool fracture events are unaffected and trigger said alarm; and
 detecting a crumbly tool break that causes said vibration signal to slowly decrease by detecting a preselected high channel gain as AGC action increases the gain.

14. The method of claim 13 wherein a gain command presented to said variable gain device is monitored and a high gain crumbly break alarm is issued upon crossing a user-set high gain threshold.

15. The method of claim 14 wherein said user-set threshold depends on cutting conditions.

16. The method of detecting cutting tool breakage by monitoring vibrations at the tool-workpiece interface, comprising:
 generating a vibration signal and preprocessing the same in an analog signal channel which has a digitally programmable variable gain device to control channel gain;
 digitally processing the analog channel output in break detection logic to search for signal patterns indicative of a major tool break and generate an abrupt break alarm;
 providing an automatic gain control (AGC) system to adjust the gain of said variable gain device and hold the analog channel output at a chosen average level, with an AGC time constant long enough that abrupt and persisting signal level changes due to tool fracture events are unaffected; and
 detecting a crumbly tool break that causes said vibration signal to slowly decrease by calculating a high gain alarm level during each cut and generating a crumbly break alarm as AGC action causes the gain to increase and cross said alarm level.

17. The method of claim 16 wherein current gain is captured at a predetermined time after start of the cut and multiplied by a given ratio to calculate said high gain alarm level, and a high gain test to compare gain with said alarm level is enabled.

18. The method of claim 17 wherein said predetermined time is considerably longer than said AGC time constant.

19. The method of claim 17 wherein said high gain test is disabled at a given time after end of the cut.

20. The method of claim 19 wherein said time at which current gain is captured is measured from rise of said analog channel output above a signal level at which said AGC system is enabled, and said high gain test is disabled at a time measured from fall of said analog channel output below the AGC enable signal level.

* * * * *